United States Patent [19]

Olson et al.

[11] Patent Number: 4,906,068

[45] Date of Patent: Mar. 6, 1990

[54] POLARIZATION-MAINTAINING OPTICAL FIBERS FOR COUPLER FABRICATION

[75] Inventors: Grieg A. Olson; James R. Onstott, both of St. Paul, Minn.

[73] Assignee: Minnesota Mining and Manufacturing Company, St. Paul, Minn.

[21] Appl. No.: 239,540

[22] Filed: Sep. 1, 1988

[51] Int. Cl.⁴ .............................................. G02B 6/10
[52] U.S. Cl. ............................ 350/96.30; 350/96.15; 350/96.20
[58] Field of Search ............... 350/96.15, 96.16, 96.29, 350/96.30, 96.20

[56] References Cited

U.S. PATENT DOCUMENTS 4,801,189  1/1989  Shaw et al. ....................... 350/96.15

Primary Examiner—Frank Gonzalez

Attorney, Agent, or Firm—Donald M. Sell; Walter N. Kirn; Stephen W. Buckingham

[57] ABSTRACT

Polarization-maintaining coupler is made by a biconically-tapered-fused process from two short lengths of an optical fiber, each having a small, oval stress-applying region that substantially contacts the core. The area of the stress-applying region of the optical fiber is less than 10 percent, preferably less than 2 percent, that of the optical fiber and preferably is contiguous with the core. Couplers of highest quality are made from quartz glass fibers having a birefringence between 1 and $3 \times 10^{-4}$. It is believed that the principal axes of the oval stress-applying regions of those couplers of highest quality have been collinear or parallel. To permit a coupler to be handled, it can be mounted on a quartz glass substrate with the coupler suspended in air and then potted in a cured elastomer.

16 Claims, 1 Drawing Sheet

POLARIZATION-MAINTAINING OPTICAL FIBERS FOR COUPLER FABRICATION

BACKGROUND OF THE INVENTION

1. Field of the Invention

The invention concerns a polarization-maintaining optical fiber that provides an improved single-mode, polarization-maintaining fiber coupler or coupler/splitter (herein simply called "coupler"). The invention also concerns a method of making the coupler and a mount for the coupler The preservation of polarization is especially important in fiber gyroscopes, interferometric sensors, and coherent communications.

2. Description of the Related Art

A single-mode optical fiber typically has a glass inner core of high index of refraction and a glass jacket of low index of refraction. Usually, the diameter of the core is from 3 to 10 micrometers, and the diameter of the jacket is 80 micrometers for sensor fibers and 125 micrometers for telecommunications. According to Shibata et al.: "Fabrication of Polarization-Maintaining and Absorption-Reducing Fibers," Journal of Lightwave Technology, Vol. LT-1, No. 1, pp. 38-43 (1983):

"The general approach to maintaining linear polarization in single-mode fibers is to increase fiber birefringence so as to reduce the power interchange between polarization modes. Several kinds of highly birefringent single-mode fibers have been demonstrated: fibers with a noncircular core, which cause birefringence due to noncircular geometry [citing Ramaswamy et al.: 'Polarization Characteristics of Noncircular Core Single-mode Fibers,' Applied Optics, Vol. 17, No. 18, pp 3014–3017 (1978)]; fibers with an elliptical cladding, which cause anisotropic strains in the core [citing Ramaswamy et al.: 'Birefringence in Elliptically Clad Borosilicate Single-mode Fibers,' Applied Optics, Vol. 18, No. 24, pp 4080–4084 (1979) and Katsuyama et al.: 'Low-loss Single Polarization Fibers,' Electron. Lett., Vol. 17, No. 13, pp 473–474 (1981)]; and fibers with refractive-index pits on both sides of the core [citing Hosaka et al.: 'Single-mode Fiber with Asymmetrical Refractive Index Pits on Both Sides of Core,' Electron. Lett., Vol. 17, No. 5, pp 191-193 (1981)]."

The Shibata publication concerns a birefringent single-mode fiber, the silica jacket of which includes two fan-shaped, diametrically-opposed regions that have been doped to have a different thermal expansion than does the rest of the jacket, resulting in anisotropic stress-induced birefringence in the core. At page 40, the Shibata publication says these fibers "were fabricated with jacketing techniques. A single-mode fiber preform made by the VAD method [citing Tomaru et al.: 'Fabrication of Single-mode Fibers by V.A.D.,' Electronics Lett., Vol. 16, No. 13, pp 511–512 (1980)]was elongated to several millimeters in diameter. Then, it was put into the center of a thick-wall jacketing silica tube with about 15-mm inner diameter. Stress-applying parts were prepared by a depositing $SiO_2$—$B_2O_3$—$GeO_2$ glass layer in a silica tube via the MCVD method. The rods prepared by the MCVD method were also elongated to several millimeters and arranged on both sides of the core rod in the jacketing tube. The remaining inner spaces in the jacketing tube were filled with several commercially available silica rods, for example, four rods with several millimeters of diameter. The final preforms were drawn into fibers by a carbon-resistance furnace."

A birefringent fiber having similarly-shaped stress-applying regions as well as an elliptical core is shown in U.S. Pat. No. 4,480,897 (Okamoto et al.). FIGS. 6 and 8 of U.S. Pat. No. 4,561,871 (Berkey) also illustrate the manufacture of birefringent fibers having diametrically-opposed stress-applying regions separated from the core.

The Shibata publication says:

"In order to reduce the transmissions loss, the stress-applying parts must be sufficiently separated from the core."

Some earlier patents did not recognize the need for such separation; see, U.S. Pat. No. 4,179,189 (Kaminow et al.) and U.S. Pat. No. 4,274,854 (Pleibel). Others such as U.S Pat. No. 4,478,489 (Blankenship) explain that if such separation is too small, there will be light transmission loss due to scattering. The Blankenship patent says that the separation should be as small as possible and indicates that when the separating material and the stress-applying regions have the same refractive index, the minimum radius to the stress-applying regions can be as small as 1.5 times the radius of the core.

Sasaki: "Long-Length Low-Loss Polarization-Maintaining Fibers," Journal of Lightwave Technology, Vol. LT-5, No. 9, pp 1139–1146 (1987), also concerns birefringent fiber having two diametrically-opposed stress-applying regions which it says should be separated from the core and that the absorption loss is satisfactorily low when the minimum radius to the stress-applying regions (r) and the radius of the core (a) have a ratio of more than 3.4. FIG. 7 of the Sasaki publication illustrates the manufacture of the fiber by forming two pits in the jacket and inserting doped rods into the pits that provide the stress-applying regions.

Katsuyama et al.: "Low-loss Single Polarization Fibers," Applied Optics, Vol. 22, No. 11, pp 1741-1747, (1983), concerns a polarization-maintaining optical fiber that is similar to that of the above-cited Ramaswamy publications in that the stress-applying region is elliptical and is the intermediate of three concentric silica regions that make up the jacket. The intermediate region is made stress inducing by being doped with $B_2O_3$. The Katsuyama publication calls this intermediate region the "elliptical-jacket." The intermediate stress-applying region also is doped with $GeO_2$ in order to make its refractive index the same as in the inner and outer of the three concentric regions. Consistent with the above quotation from the Shibata publication, the Katsuyama publication explains that ratio of the "core radius" to the "clad radius" (i.e., minimum radius to the "elliptical jacket") must be less than 0.5 to minimize absorption loss.

Three polarization-maintaining optical fibers are illustrated in U.S. Pat. No. 4,515,436 (Howard et al.). The fiber of FIG. 3 has a "highly elliptical inner cladding layer 32" that may comprise boron-doped $SiO_2$ which is surrounded by an elliptical "outer cladding layer 34" that may comprise fluorine-doped $SiO_2$ within a jacket that apparently is undoped silica. The large ellipticity of the "inner cladding layer thereby induces a large stress on the fiber, sufficient to significantly separate the two polarizations of the fundamental mode" (Column 4, lines 47-50).

Even though the stress-applying regions of some of the above-discussed prior polarization-maintaining fibers, such as that of FIG. 3 of the Howard patent, are not separated from the core, it is believed that all polarization-maintaining fibers currently on the market have such a separation and that (as taught in the Katsuyama publication) the ratio of the radius of the core to the minimum radius to the stress-applying regions is always less than 0.5 (typically about 0.2). Otherwise, a large proportion of light transmitted by the core would be absorbed by the doped, stress-producing region.

Important applications for polarization-maintaining fibers require a coupler that maintains the polarization. Numerous couplers have been reported. Villarruel et al.: "Fused Single-mode-fibre Access Couplers," *Electronics Lett.*, Vol. 17, pp 243–244 (1980), employs cladding removal by radially etching to within a few micrometers of the core diameter, but by removing the stress-inducing regions, this apparently destroys the polarization-maintaining property. Kawasaki et al., "Biconical-taper Single-mode Fiber Coupler," *Opt. Lett.*, Vol. 6, pp 327–328 (1981), employs fusion and tapering without etching to produce a biconically-tapered-fused coupler. In Villarruel et al.: "Polarization Preserving Single-mode-fibre Coupler," *Electronics Lett.*, Vol. 19, pp 17–18 (1983), etching, fusion and tapering are combined, with no attempt being made to align the polarization axes of the coupler fibers. Nevertheless, the polarization was said to be satisfactorily maintained, and this was attributed to the large inherent birefringence of the fibers.

Dyott et al.: "Polarization-holding Directional Coupler Made from Elliptically Cored Fibre Having a D Section," *Electronics Lett.*, Vol. 19, pp 601 and 602 (1983), employs a fiber that has an elliptical core and a cladding that has a D-shaped cross section, with the core close to the flat side of the D. In order to make a coupler, a small amount of material is etched from the surface of both fibers over a short length, and the fibers are positioned in the bore of a glass tube with the etched region adjacent and the flats of the Ds facing each other. The glass tube is heated and pulled to draw down a central section at which the cores come very close together.

In the coupler of Kawachi et al.: "Fabrication of Single-polarization Single-mode-fibre Couplers," *Electronics Lett.*, Vol. 18, No. 22 (1982), polarization is maintained by fusing two side-by-side optical fibers that are similar to those of the above-cited Ramaswamy, Birch, and Shibata publications, the Okamoto and Berkey patents, and FIG. 1 of the Blankenship patent. That is, the fibers that have diametrically-opposed stress-applying regions separated from the core. Polarization is said to be maintained in any of three possible alignments, namely, when the principal axes of the stress-applying regions of the two fibers are parallel, collinear, or perpendicular.

Yokohama et al.: "Polarization-Maintaining Fibre Couplers with Low Excess Loss," *Electronics Lett.*, Vol. 22, No. 18, pp 929 and 930 (1986), concerns polarization-maintaining couplers made by fusing two aligned fibers that also have diametrically-opposed stress-applying regions spaced from the core. As preferred in the Blankenship patent, the stress-applying regions and the surrounding jacket or cladding have the same index of refraction. The coupler is made by aligning the polarization principal axis of two side-by-side fibers, fusing them together, and elongating a portion of the fused region "until the prescribed coupler ratio was obtained." The Yokohama publication reports an "excess loss of less than 0.1 dB was easily achieved" and that the best value was 0.03 dB. It also reports polarization cross talk (also called "polarization extinction coefficient") of less than −30 dB. Both of these values are about an order of magnitude better than in any coupler that we have seen on the market.

Pleibel et al.: "Polarization-Preserving Coupler with Self-aligning Birefringent Fibres," *Electronics Lett.*, Vol. 19, pp 825 and 826 (1983), forms a coupler from fibers which are birefringent by having a highly-doped elliptical region in the cladding. "The fibre, together with its acrylate coating, is bent and bonded into a 25 cm radius in a silica block. One side of the fibre and its coating are polished away while actively monitoring the light transmitted through the fibre. When the transmitted light begins to drop, the polishing is stopped, and the two halves are placed together to check the coupling. The process is repeated until the desired level of coupling is obtained." U.S. Pat. No. 4,564,262 (Shaw) concerns a similar process, but says nothing about monitoring light transmission during the process.

In U.S. Pat. No. 4,632,513 (Stowe et al.), parallel juxtaposition segments of a pair of single-mode optical fibers are fused together to form a coupler which is polarization insensitive.

SUMMARY OF THE INVENTION

The invention provides a polarization-maintaining optical fiber that can be used to make a polarization-maintaining single-mode fiber coupler that is believed to have both substantially less transmission loss and to be substantially better polarization maintaining, as compared to any coupler that has appeared on the market. Furthermore, the polarization-maintaining coupler of the invention should be significantly less expensive to manufacture than is any polarization-maintaining coupler that has appeared on the market.

Like some polarization-maintaining optical fibers of the prior art, that of the invention has a jacket with an index of refraction substantially lower than that of the core, and the jacket includes an oval stress-applying region. The novel optical fiber differs from those of the prior art in that the jacket has a substantially uniform index of refraction and the stress-applying region has a thermal coefficient of expansion that affords to the fiber a birefringence between $1 \times 10^{-4}$ and $3 \times 10^{-4}$ (preferably from 1 to $2 \times 10^{-4}$), substantially contacts the core, and has an area less than 10 percent that of the fiber.

By "substantially contacts" is meant that the stress-applying region is not separated from the core either by more than 2 $\mu$m or by more than 80 percent of the radius of the core. If the stress-applying region were separated from the core by more than about 2 $\mu$m, it would be very difficult to attain both a birefringence between 1 and $3 \times 10^{-4}$ and a stress-applying region with an area less than 10 percent that of the fiber.

A birefringence between 1 and $3 \times 10^{-4}$ corresponds to a range of about 8–3 mm beat length at a wavelength of 850 mm.

Like conventional polarization-maintaining fibers that have an oval stress-applying region (see the above-discussed Katsuyama publication), the novel fiber preferably is made by chemical vapor deposition (CVD) or modified chemical vapor deposition (MCVD). Because its stress-applying region is so small and preferably is contiguous with the core, the novel fiber can be made in about half the time required to make a conventional polarization-maintaining fiber and with far fewer failures.

The novel polarization-maintaining optical fiber can be converted into a polarization-maintaining coupler of the invention by the steps of (1) placing two short lengths of the optical fiber side-by-side,
(2) aligning the polarization axes of the two lengths,
(3) fusing the lengths together, and
(4) while launching light into one of the lengths, drawing the fused lengths until light being emitted from the lengths reaches a predetermined relationship, usually when equal light is emitted from the fused lengths.

When the drawing step (4) is stopped at equal light output, the fused portion of the resulting coupler is substantially dumbbell shaped in cross section. In experimentation to date, the maximum diameter at the coupler waist has been from ⅓ to ½ the original single fiber diameter and from 1.5 to 1.8 times the minimum diameter through a core. Typically when using optical fibers about 90 μm in diameter, the maximum diameter at the coupler waist has been from 30 to 45 μm.

In step (3) of the outlined method, the aligned lengths preferably are heated by an unusually wide torch (larger than 0.5 cm in diameter) so that there is no need to move the torch relative to the lengths during the method. Without moving the torch, the fused portion of the resulting coupler is from about 2 to 3 cm in length. The unfused ends of the fused lengths of the optical fiber can then be trimmed to an overall length of about one meter to provide arms or leads that can easily be spliced mechanically to conventional polarization-maintaining fibers. The length of those leads can be further reduced during splicing.

In spite of the fact that the optical fiber from which the novel coupler is made is relatively inexpensive and the process of converting two lengths of the fiber into a coupler is also relatively inexpensive, the coupler of the invention is superior in performance to any coupler we have seen on the market. In about half of the prototype couplers made to date, all of which had been trimmed to an overall length of about one meter, the excess loss has been less than 0.1 dB. In most of the others, the excess loss has been about 0.3 dB or less. Also, the extinction ratios of at least half of the prototype couplers are better than 20 dB, whereas the best couplers now on the market are believed to have extinction ratios in the range from 15 to 20 dB. Testing also has indicated that the prototype couplers retain their properties better over a wide range of temperatures ($-40°$ to $70°$ C.) than do the best couplers now on the market.

The low cost of the novel coupler is due in part to the ability to form it by a biconically-tapered-fused process which does not require the etching or polishing steps that have often been used in the prior art.

It is surprising that lower cost, reduced chance of failure, and superior performance can all be achieved at the same time in the production of prototype couplers of the invention. It is even more surprising that the prototype couplers of highest quality have been obtained from fibers having a birefringence between 1 and $3 \times 10^{-4}$ in spite of the fact that of fibers now on the market, those that best maintain polarization have birefringences on the order of 4 to $5 \times 10^{-4}$. The prototype couplers of highest quality have been made from optical fiber, the stress-applying regions of which provided from 1 to 3 percent of the area of the fiber and was contiguous with the core.

In making prototype couplers, we have not yet been able to determine whether the major polarization axes of the paired lengths of the optical fiber are parallel, collinear, or perpendicular (see above discussion of the Kawachi publication). Hence, it can be assumed that in about half of the prototype couplers, those axes should be perpendicular and in the other half, either collinear or parallel. It is believed, but has not been established, that in couplers having superior performance, the principal axes of the oval stress-applying regions have been collinear or parallel when the paired fiber lengths have been fused together.

The oval stress-applying regions of the paired fiber lengths from which the prototype couplers have been made were elliptical. To obtain couplers of high polarization-maintaining quality, the minor axis of the stress-applying region of the starting fiber can approximate the core diameter but should not exceed twice the core diameter. If the minor axis were substantially greater, the stress-applying region could not provide less than 10 percent of the area of the fiber and also be sufficiently elongated to afford a coupler having high polarization-maintaining quality. For best results, the major axis of the stress-applying region of the starting optical fiber should be from 25 to 40 μm when the diameter of the core is about 5 μm.

THE DRAWING

The invention may be more easily understood in reference to the drawing, all figures of which are schematic. In the drawing.

Figure 1:
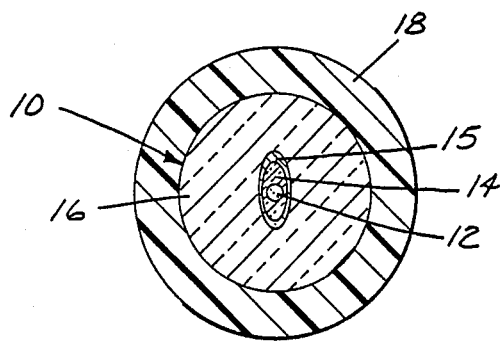
FIG. 1 is a cross section through a preferred optical fiber of the invention.

The optical fiber 10 shown in FIG. 1 can be produced as disclosed in Example 1 below. It has, as viewed in cross section, a circular core 12 (called "Layer-3" in Example 1) and a contiguous elliptical stress-applying region 14 (called "Layer-2" in Example 1), the minor axis of which is slightly larger than the diameter of the core. Surrounding the stress-applying region is a thin layer 15 (called "Layer-1" in Example 1) and an outer jacket 16 that are optically identical to each other for reasons explained in Example 1 and together provide the jacket or cladding of the optical fiber 10. Over the jacket is a resinous protective covering 18.

Figure 2:
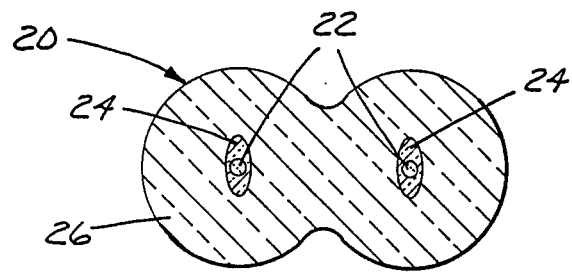
FIG. 2 is a cross section, greatly enlarged, through a preferred coupler of the invention made from two short lengths of the fiber of FIG. 1.

The coupler 20 of FIG. 2 has, as viewed in cross section, two circular cores 22, each surrounded by an elliptical stress-applying region 24 and having a dumbbell-shaped jacket 26. The principal axes of the two stress-applying regions are parallel to each other.

Figure 3:
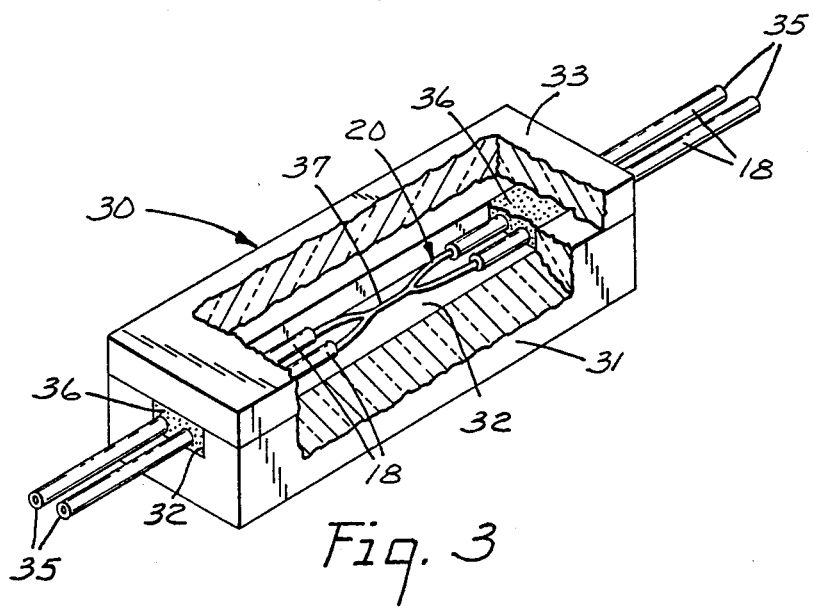
FIG. 3 is an isometric view, partly broken away, of a mount for the coupler of FIG. 2.

In FIG. 3, a mount 30 for the coupler 20 has a substrate 31 which is formed with a channel 32 that is enclosed by a cover 33. The substrate and cover should have approximately the same thermal coefficient of expansion as does the optical fiber 10. Each of the substrate cover, and optical fiber preferably is quartz glass. The arms or leads 35 of the coupler are bonded to the substrate and cover by adhesive 36 so that the stripped area 37 of the coupler is kept out of contact with the mount and the adhesive contacts only the resinous protective covering 18. By thus suspending the coupler in air without anything touching the bare glass, the extinction ratio is much better than it would have been had there been contact, e.g., if the adhesive 36 had contacted the bare glass.

In the following examples, all parts are by weight.

EXAMPLE 1

(Making a Polarization-Maintaining Fiber of the Invention)

A. Preform Fabrication:

The preform in this example was fabricated by the modified chemical vapor deposition process (MCVD). In this process, glass of controlled composition and thickness is deposited on the inside of a fused silica tube by the chemical reaction of oxygen with metal chlorides or bromides. A more complete description of the process may be found in U.S Pat. No. 4,217,027 (MacChesney et al.).

A fused silica tube (General Electric #982 WGl) with an inside diameter of 17.0 mm and an outside diameter of 20.0 mm was inserted into a deposition apparatus (preform lathe, gas flow system, hydrogen torch). The inside wall of the tube was first etched with fluorine to produce an uncontaminated surface for deposition. Three layers of glass were then deposited on the inside wall of the tube. The function and composition of the three layers is described below.

| | Function | Composition |
|---|---|---|
| Layer-1 | Jacket Layer | $SiO_2/P_2O_5/F$ |
| Layer-2 | Stress-applying region | $SiO_2/B_2O_3/GeO_2/P_2O_5$ |
| Layer-3 | Waveguide core | $SiO_2/GeO_2$ |

Between the second clearing pass and the application of Layer-3, there was a pre-collapse step. Stepwise conditions were as reported in Table I.

TABLE I

| Step | Vapor Flow (cm³/min)* | | | | | | | No. of Passes | Temp (°C.) | Burner Spindle Speed (rpm) | Speed (mm/min) |
| | $SiCl_4$ | $GeCl_4$ | $POCl_3$ | $BBr_3$ | Fe | He | $O_2$ | | | | |
|---|---|---|---|---|---|---|---|---|---|---|---|
| Etch | | | | | 20 | | 1000 | 1 | 1850 | 50 | 150 |
| Layer-1 | 500 | | 95 | | 2 | 600 | 400 | 14 | 1590 | 50 | 130 |
| Clear | | | | | | | 400 | 1 | 1590 | 50 | 130 |
| Layer-2 | 300 | 200 | 75 | 300 | | | 2000 | 3 | 1675 | 50 | 200 |
| Clear | | | | | | | 2000 | 4 | 1835 | 50 | 200 |
| Pre-collapse | | | | | | | 2000 | 1 | 1815 | 50 | 22 |
| Layer-3 | 30 | 14 | | | | | 1000 | 1 | 1625 | 50 | 150 |

*Vapor Flow indicates flow of carrier gas ($O_2$ for the $SiCl_4$, $GeCl_4$ and $BBr_3$ and Ar for the $BBr_3$) or direct flow of "Freon" ("Fr"), He and $O_2$.

Layer-1 was optically identical to the fused silica tube and hence became part of the outer jacket. It was applied only to permit the core of the polarization-maintaining fiber of Example 1 to have a diameter of 5 μm upon drawing the fiber to a diameter of 90 μm.

Temperatures reported in Table I were pyrometer readings of the external surface of the fused silica tube.

After completion of the deposition process, the annular preform was collapsed to a solid rod by standard techniques.

B. Preform Shaping:

Two diametrically opposed flats were ground with a conventional surface grinding machine and a diamond grinding wheel, removing at each flat 2.13 mm radially.

Then the preform was thoroughly cleaned to remove any particulate contamination resulting from the grinding.

C. Fiber Draw:

Using a zirconia induction furnace, the preform was drawn into a fiber having a diameter of 90 μm while maintaining a temperature sufficiently high to give the fiber a circular cross-section. To do so, the diameter of the fiber was continuously monitored in two perpendicular directions while adjusting the furnace temperature to keep the diameter the same in both directions. As soon as the fiber emerged from the furnace, it was coated with a UV-polymerizable acrylate (950X075 from DeSoto Co.), exposed to ultraviolet radiation, overcoated with another UV-polymerizable acrylate (3471-2-6 from DeSoto), and exposed in the same way to provide a resinous protective cover, then wound up on a reel.

The resulting optical fiber had the following properties:

| | |
|---|---|
| Length | 500 m |
| Coating OD | 205 μm |
| Jacket OD | 90 μm |
| Core diameter | 5 μm |
| Elliptical stress-applying region | |
| Major axis | 27 μm |
| Minor axis | 7 μm |
| Area vs. total area of fiber | 2 % |
| Attenuation at 850 nm | 8.0 dB/km |
| Cutoff | 770 nm |
| Mode field Diameter at 850 nm | 5.9 μm |
| H-parameter | $8.1 \times 10^{-6} m^{-1}$ |
| Beat Length at 850 nm | 6.4 6.4 mm |
| Birefringence | $1.3 \times 10^{-4}$ |

EXAMPLE 2

(Making a Coupler of the Invention)

Two lengths of the polarization-maintaining optical fiber of Example 1 were converted into a coupler of the invention by the biconically-tapered-fused technique.

Sequential steps were:

(a) A 2.8 cm long central portion of each length of the fiber was mechanically stripped of its dual-layer acrylate coating and then cleaned chemically.

(b) Each length of the fiber was oriented by the method described in Carrara et al.: "Elasto-Optic Alignment of Birefringent Axes in Polarization Holding Fiber", Optics Letters, Vol. 11, pp. 470–472 (1986). In doing so, an attempt was made to align the fast and slow principal axes of the two lengths to be respectively parallel or collinear, but there was no assurance that the alignments were not perpendicular.

(c) The lengths were held parallel in vacuum chucks.

(d) The two fiber ends on one side of the chucks were cleaved and placed in optical detection systems.

(e) Polarized light 850 nm in wavelength was launched into one of the leads at the other side of the chucks.

(f) The bare sections of the fiber lengths were pushed together over a length of 2.3 cm, and a UV-curable adhesive was used to bond the ends of the bare sections together.

(g) The central portions of the bare sections were heated with a stationary hydrogen torch 1 cm in diameter, thus fusing the fibers over a length of about 0.5 cm.

(h) Immediately after the fiber lengths fused together, the chucks were separated at a rate of 0.2 mm/sec until their added separation was 10 mm, and then the separation speed was reduced to about 0.04 mm/sec; this was stopped and the heat was withdrawn as soon as equal light output was detected at the optical detection systems. The cross-section at the center of the resulting coupler was as illustrated in FIG. 2 of the drawing to have:

| | |
|---|---|
| Maximum diameter at coupler waist | 35 μm |
| Minimum diameter through each core | 20 μm |
| Minimum diameter centrally between cores | 15 μm |
| Estimated length of fused portion | 25 mm |
| Approximate length of each lead | 1 m |

(i) The coupler was mounted in the channel of a quartz glass substrate using UV-curable adhesive (as shown in FIG. 3), and this adhesive was cured by exposure to UV radiation through the quartz cover.

(j) The mounted coupler was inserted into a housing and there potted in a room-temperature-curing elastomer to provide a hermetically sealed outer protective package suitable for handling and testing as reported Eleven potted couplers produced as in Example 2 had the following properties:

| Coupler | Coupling Ratio | Excess Loss (dB) | Extinction Ratio* (dB) | | | |
|---|---|---|---|---|---|---|
| | | | 1-3 | 1-4 | 2-3 | 2-4 |
| A** | 51 | 0.27 | 28.2 | 20.0 | 28.1 | 27.3 |
| B | 49 | 0.83 | 19.4 | 25.4 | 27.5 | 27.7 |
| C | 48 | 0.31 | 31.6 | 30.4 | 27.5 | 30.5 |
| D | 55 | 0.02 | 23.5 | 23.8 | 20.2 | 20.1 |
| E | 47 | 0.05 | 32.2 | 25.6 | 25.3 | 28.9 |
| F | 51 | 0.01 | 28.1 | 17.5 | 19.2 | 27.9 |
| G | 54 | 0.18 | 21.4 | 18.8 | | |
| H | 51 | 0.08 | 28.0 | 19.9 | | |
| I | 56 | 0.08 | 31.5 | 26.5 | 33.5 | 31.7 |
| J | 53 | 0.25 | 30.5 | 20.2 | 19.9 | 27.4 |
| K | 54 | 0.01 | 35.6 | 28.0 | 30.0 | 33.0 |

*1-3 and 1-4 are polarization extinction ratios for the uncoupled and coupled output leads, respectively, with lead 1 as the input; 2-3 and 2-4 are values with lead 2 as the input.
**For Coupler A, Coupling Ratio and Excess Loss were measured at 820 nm; all other measurements were made at 850 nm.

We claim:

1. A polarization-maintaining optical fiber comprising a jacket having an index of refraction substantially lower than that of the core, which jacket includes an oval stress-applying region that
   has a thermal coefficient of expansion that affords to the fiber a birefringence of from 1 to $3 \times 10^{-4}$,
   substantially contacts the core, and
   has an area less than 10 percent that of the fiber.

2. A polarization-maintaining optical fiber as defined in claim 1 wherein the oval stress-applying region affords a birefringence of at least 3 mm beat length at a wavelength of 850 nm.

3. A polarization-maintaining optical fiber as defined in claim 1 wherein the oval stress-applying region is substantially elliptical and its minor axis approximates the diameter of the core.

4. A polarization-maintaining optical fiber as defined in claim 3 wherein the minor axis of the elliptical stress-applying region does not exceed twice the diameter of the core.

5. A polarization-maintaining fiber as defined in claim 4 wherein the diameter of the core is about 5 μm and the maximum diameter of the stress-applying region is from 25 to 40 μm.

6. A polarization-maintaining coupler comprising two lengths of a biconically-tapered-fused, polarization-maintaining optical fiber, each length comprising an inner core of high index of refraction and a jacket of relatively low index of refraction which includes an oval stress-applying region that
   has a thermal coefficient of expansion that affords to the fiber a birefringence of from 1 to $3 \times 10^{-4}$,
   substantially contacts the core, and has an area less than 10 percent that of the fiber.

7. A polarization-maintaining coupler as defined in claim 6, the fused portion of which is substantially dumbbell shaped in cross section.

8. A polarization-maintaining coupler as defined in claim 7 wherein each of the lengths of polarization-maintaining optical fiber has an original diameter and the dumbbell-shaped portion has a waist and the maximum diameter of the coupler waist is from one third to one half the original single fiber diameter.

9. A polarization-maintaining coupler as defined in claim 7 wherein the maximum diameter of the coupler waist is from 1.5 to 1.8 times the minimum diameter of the coupler through the core.

10. A polarization-maintaining coupler as defined in claim 9 wherein the fused portion is from 2 to 3 cm in length.

11. Mount for a polarization-maintaining coupler comprising
    a pair of biconically-tapered-fused lengths of optical fiber wherein the optical fibers form leads to the fused portion, the leads of which have protective coverings and the fused portion of which is bare,
    a rigid substrate having approximately the same thermal coefficient of expansion as does the fused portion of the coupler,
    means for mounting said leads to suspend the fused portion tautly out of contact with both the substrate and the mounting means, and
    means enclosing the coupler within a protective package with the coupler suspended in air.

12. Mount as defined in claim 11 wherein both the optical fiber and said rigid substrate comprise quartz glass.

13. Mount as defined in claim 12 wherein said rigid substrate is formed with a channel that is enclosed by a quartz glass cover.

14. Mount as defined in claim 13 wherein said mounting means comprises an adhesive that bonds the protective coverings of the leads to the substrate without touching the coupler glass.

15. Mount as defined in claim 14 wherein said enclosing means comprises a cured elastomer.

16. Method of making a polarization-maintaining coupler comprising the steps of (1) placing side-by-side two short lengths of an optical fiber, each comprising a jacket having an index of refraction substantially lower than that of the core, which jacket includes an oval stress-applying region that
has a thermal coefficient of expansion that affords to the fiber a birefringence of from 1 to $3 \times 10^{-4}$, substantially contacts the core, and has an area of less than 10 percent that of the fiber;
(2) aligning the polarization axes of the two fiber lengths,
(3) fusing the two fiber lengths together, and
(4) while launching light into one of the fiber lengths, drawing the fused lengths until light being emitted from the lengths reaches a predetermined relationship.

* * * * *